United States Patent
Fujimori et al.

(10) Patent No.: US 6,438,607 B1
(45) Date of Patent: *Aug. 20, 2002

(54) SYSTEM USING ARP OR RARP PACKET FOR COMMUNICATING OFFSET ADDRESS OF AN APPLICATION PROGRAM AND COMPUTER UNIQUE ID OF A COMPUTER

(75) Inventors: Takahiro Fujimori; Makoto Sato, both of Tokyo; Tomoko Tanaka, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/328,875

(22) Filed: Jun. 8, 1999

Related U.S. Application Data (63) Continuation of application No. 08/927,625, filed on Sep. 11, 1997, now Pat. No. 5,978,854.

(30) Foreign Application Priority Data

Sep. 11, 1996  (JP) ............................ P08-262568

(51) Int. Cl.$^7$ .............................. G06F 13/00
(52) U.S. Cl. ..................... 709/245; 709/228; 709/227; 709/237
(58) Field of Search .................. 710/305, 30; 370/402, 370/234, 420; 711/1; 709/245, 220, 227, 237

(56) References Cited

U.S. PATENT DOCUMENTS

| | | |
|---|---|---|
| 5,388,213 A | 2/1995 | Oppenheimer et al. |
| 5,490,258 A | 2/1996 | Fenner |
| 5,632,016 A | 5/1997 | Hoch et al. |
| 5,666,362 A | 9/1997 | Chen et al. |
| 5,799,002 A | 8/1998 | Krishman |
| 5,802,055 A | 9/1998 | Krein et al. |
| 5,815,678 A | 9/1998 | Hoffman et al. |
| 5,978,854 A | 11/1999 | Fujimori et al. ............ 709/245 |

OTHER PUBLICATIONS

Bill Croft (Stanford University), John Gilmore (Sun Microsystems), "Bootstrap Protocol (BOOTP)", Network Working Group—Request For Comments, No. 951, Sep. 1985, XP002053146.

T. Bradley & C. Brown, "Inverse Address Resolution Protocol", Network Working Group—Request For Comments, No. 1293, Jan. 1992, pp. 1–5, XP002053147.

Finlayson, Mann, Mogul, Theimer (Stanford University), "A Reverse Address Resolution Protocol", Network Working Group—Request For Comments, No. 903, Jun. 1984, pp. 1–3, XP002053148.

*Primary Examiner*—Le Hien Luu
(74) *Attorney, Agent, or Firm*—Frommer Lawrence & Haug LLP; William S. Frommer; Bruno Polito

(57) ABSTRACT

An electronic network system for implementing ARP (Address Resolution Protocol) and RARP (Reverse Address Resolution Protocol) type communication. ARP type communication is facilitated by including within the ARP response packet an offset address indicating the memory location of the software application that is the subject of the ARP type communication. RARP type communication is facilitated by providing each network node with a network unique ID and using the unique ID when generating RARP requests.

18 Claims, 6 Drawing Sheets

| IP ADDRESS | PHYSICAL ADDRESS | | NODE UNIQUE ID |
|---|---|---|---|
| | BUS ID | NODE ID | |
| 1 | 0 | 0 | 123 |
| 2 | 1 | 0 | 213 |
| 3 | 0 | 1 | 456 |
| 4 | 1 | 1 | 641 |
| 5 | 0 | 2 | 564 |
| 6 | 1 | 2 | 702 |
| 7 | 1 | 3 | 731 |

SYSTEM USING ARP OR RARP PACKET FOR COMMUNICATING OFFSET ADDRESS OF AN APPLICATION PROGRAM AND COMPUTER UNIQUE ID OF A COMPUTER

This is a continuation application of application Ser. No. 08/927,625 filed on Sep. 11, 1997, now U.S. Pat. No. 5,978,854.

FIELD OF THE INVENTION

This invention relates to electronic networks, and more particularly to an improved technique for implementing communications between two nodes in an electronic network.

BACKGROUND OF THE INVENTION

There are many well known protocols for implementing electronic communication in a network. Two such protocols are the Address Resolution Protocol (ARP) and the Reverse Address Resolution Protocol (RARP). The ARP and RARP protocols may be used, for example, to implement communications in a network that includes two or more network nodes connected via an electronic bus. An exemplary network is shown in FIG. 1.

Figure 1:
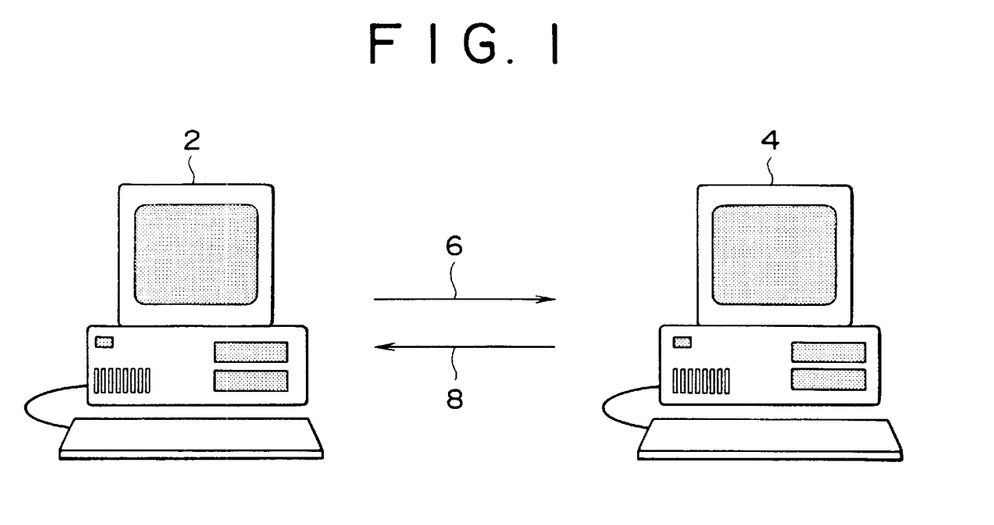
FIG. 1 is a schematic diagram of an electronic network useful in describing ARP type and RARP type communications.

As can be seen from FIG. 1, transmissions directed from a first general purpose computer 2 to a second general purpose computer 4 are indicated by an arrow 6. Similarly, communications directed from the second computer to the first computer are indicated by an arrow 8. It should be understood that an electronic bus, such as an IEEE-1394 serial bus, interconnects computers 2 and 4, and is used to channel transmissions between the computers. The transmissions are abstractly represented by arrows 6 and 8. Furthermore, it should be understood that although FIG. 1 shows only two computers, the network represented in FIG. 1 may be made up of more than two computers. FIG. 1 is referenced below for purposes of describing ARP and RARP communication in more detail.

ARP may be used when a first network computer wishes to communicate with a second network computer but does not know the second computer's physical address. For example, computer 2 may wish to communicate with computer 4 but has only computer 4's internet protocol address (or "IP address") and not computer 4's physical address. In accordance with ARP, computer 2 broadcasts an "ARP request" (represented by arrow 6) over the network bus. The request includes the IP address of computer 4. By examining the IP address of the request, computer 4 recognizes that it is the intended recipient of the request. Computer 4 then transmits an "ARP response" (represented by arrow 8), which is addressed to computer 2 and contains computer 4's physical address.

RARP may be used when a network computer wishes to determine its IP address through the network. For example, computer 2, wishing to determine its IP address, broadcasts a "RARP request" (represented by arrow 6) over the network. The RARP request includes the IP address of computer 4, as well as the physical address of computer 2. After computer 4 ascertains that it is the intended recipient of the RARP request—through examination of the IP address—it determines the IP address of computer 2 by cross-referencing computer 2's physical address to computer 2's IP address and then transmits a "RARP response" (represented by arrow 8), which includes the IP address of computer 2.

Both ARP and RARP have drawbacks which limit their effectiveness. In ARP, a requesting node is limited to acquiring the physical address of a target node, and cannot acquire information that would facilitate communication between itself and the target node. In particular, the requesting node cannot acquire the address within the target computer of the application which is the subject of the request. Thus, in FIG. 1 for example, once computer 2 determines the physical address of computer 4, communication between the two computers may proceed, but each time computer 4 receives a communication packet from computer 2, computer 4's processing unit (CPU) must examine the received packet and then forward the packet to an appropriate application within its memory. Moreover, the size of the communication packets is limited in ARP, further limiting flexibility.

A drawback of RARP is its sensitivity to bus resets. When a network bus is reset—such as when the power supply is toggled, or a new device is connected to the network—the physical addresses of the network nodes may change, resulting in the generation of incorrect cross-references by nodes generating RARP responses. Thereby, resulting in the transmission of incorrect IP addresses to requesting nodes.

OBJECTS AND SUMMARY OF THE INVENTION

It is an object of the present invention to provide a network communication system wherein ARP type communication is facilitated by providing nodes that generate ARP requests with additional information about responding nodes and by allowing for variable length ARP communication packets.

It is a further object of the present invention to provide a network communication system wherein RARP type communication is facilitated by reducing the network's sensitivity to bus resets.

In accordance with the invention, when an ARP type communication session is initiated through request and response packets, the response packet includes an offset address specifying the location of the software application that is the subject of the session. Thereby, allowing session packets subsequent to the response packet to be addressed directly to the application, and allowing those subsequent packets to be of variable size. Furthermore, each network node is assigned a node unique ID for the purpose of providing an unchanging identifier for each node. Thereby, providing an unchanging physical address reference for use in RARP type requests, and allowing RARP type communication to be conducted without interference from network resets.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 2:
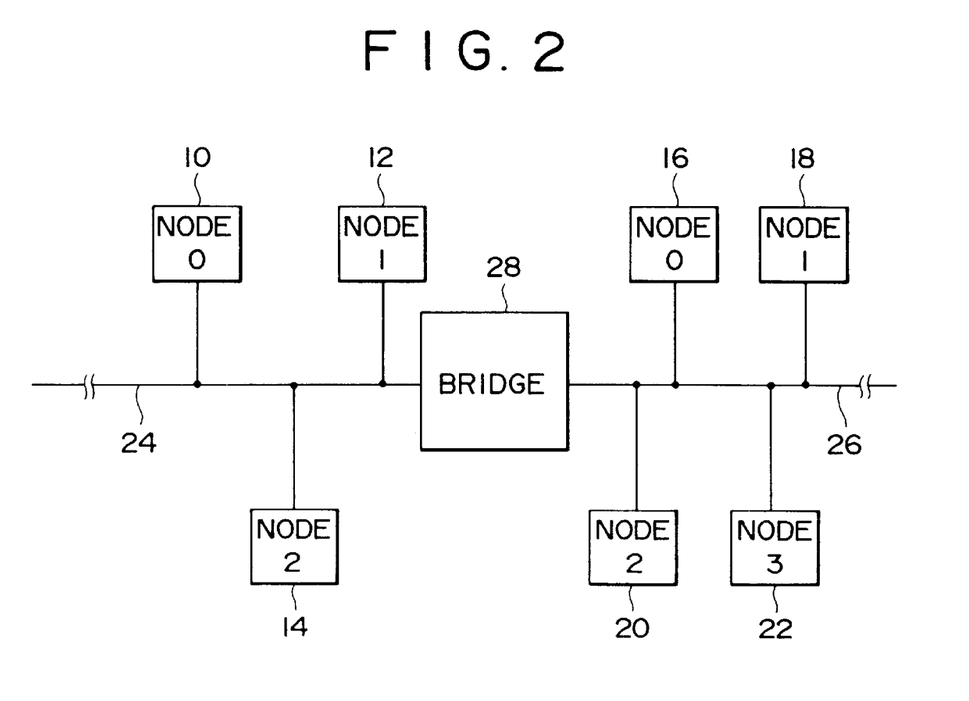
FIG. 2 is a schematic diagram of an electronic network in accordance with the invention.

FIG. 2 shows an electronic network in which the present invention may be employed. As can be seen from the figure, the network includes two buses, bus 24 and bus 26, that are coupled together via a bridge 28. Bus 24 is coupled to three nodes, nodes 10, 12 and 14, and bus 26 is coupled to four nodes, nodes 16, 18, 20 and 22. For purposes of illustration, each node of FIG. 2 is considered to be a general purpose computer, buses 24 and 26 are considered to be IEEE-1394 buses, and the bridge is considered to be an IEEE-1394 bridge—although in view of this disclosure it will be apparent that many types of nodes, buses, and bridges are suitable for implementing the invention.

In any event, the buses and nodes of FIG. 2 are assigned identification numbers (IDs). Buses 24 and 26 are referred to as buses "0" and "1", respectively. Nodes 10, 12 and 14 are referred to as nodes "0", "1" and "2", respectively, and nodes 16, 18, 20 and 22 are referred to as nodes "0", "1", "2" and "3", respectively—any two nodes having the same ID being distinguished by the busses to which they are coupled. In addition, each of nodes 10–22 is assigned a node unique ID which is sufficient to uniquely identify each node without referring to bus IDs and/or node IDs. The bus IDs, node IDs and node unique IDs are stored in an address cache table along with the node IP addresses. Preferably, a copy of the address cache table is stored within each network node.

Figure 3:
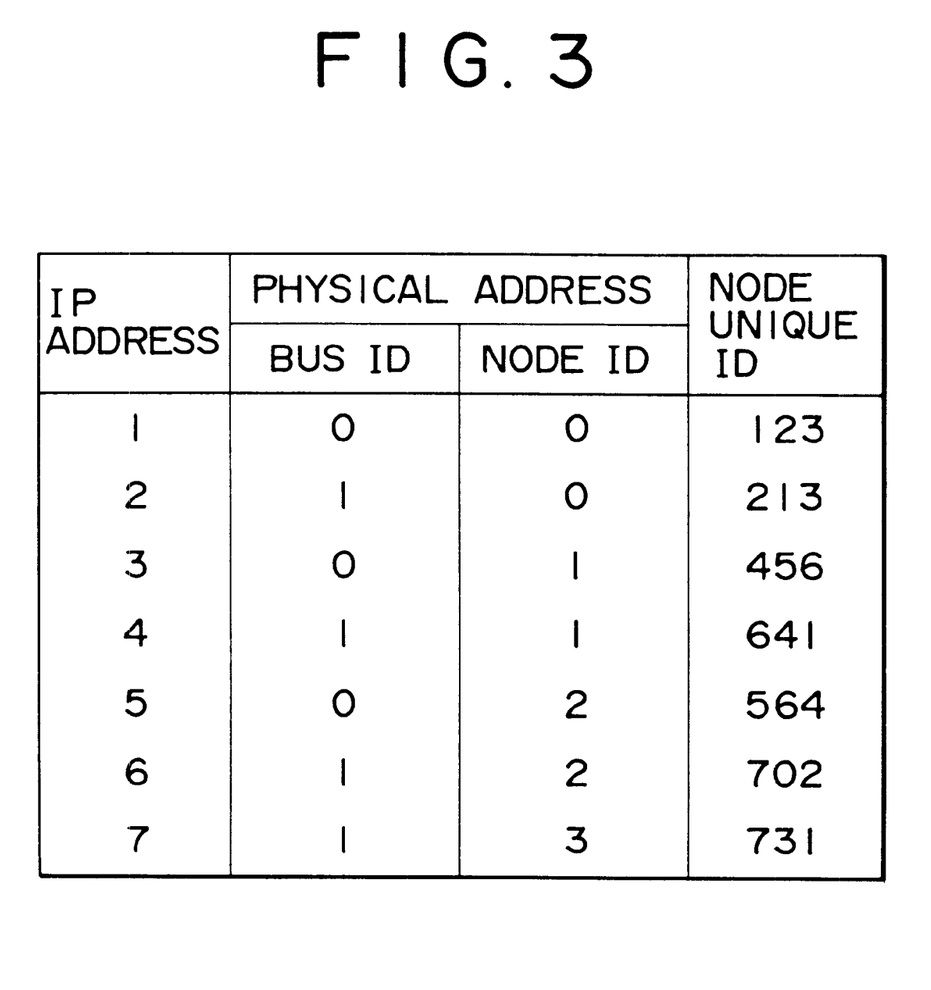
FIG. 3 is a representation of an address cache table in accordance with the invention.

An exemplary address cache table corresponding to the network of FIG. 2 is shown in FIG. 3. One way in which each of the network nodes may acquire the address cache table is through ARP type signaling. That is, in the course of conducting an ARP type session, a responding node may send the requesting node its bus ID, node ID, node unique ID, and IP address, which the requesting node then stores in its address cache table. Of course, at any given time the requesting node's table may or may not contain updated information for all nodes in the network.

Having described an exemplary network configuration and an exemplary address cache table, ARP type and RARP type communication in accordance with the invention will now be described in detail.

Figure 4:
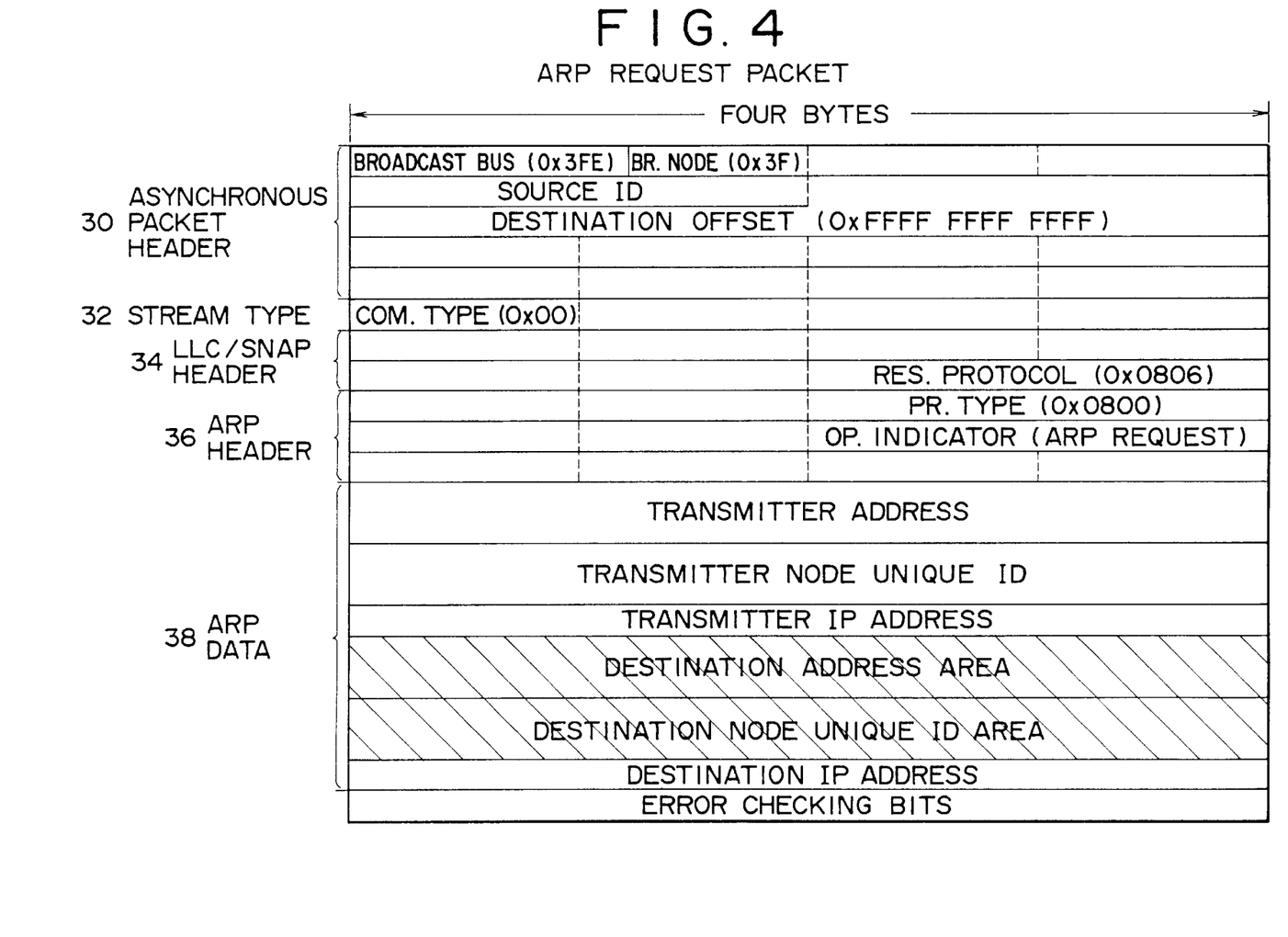
FIG. 4 is a representation of an ARP type request packet in accordance with the invention.
Figure 5:
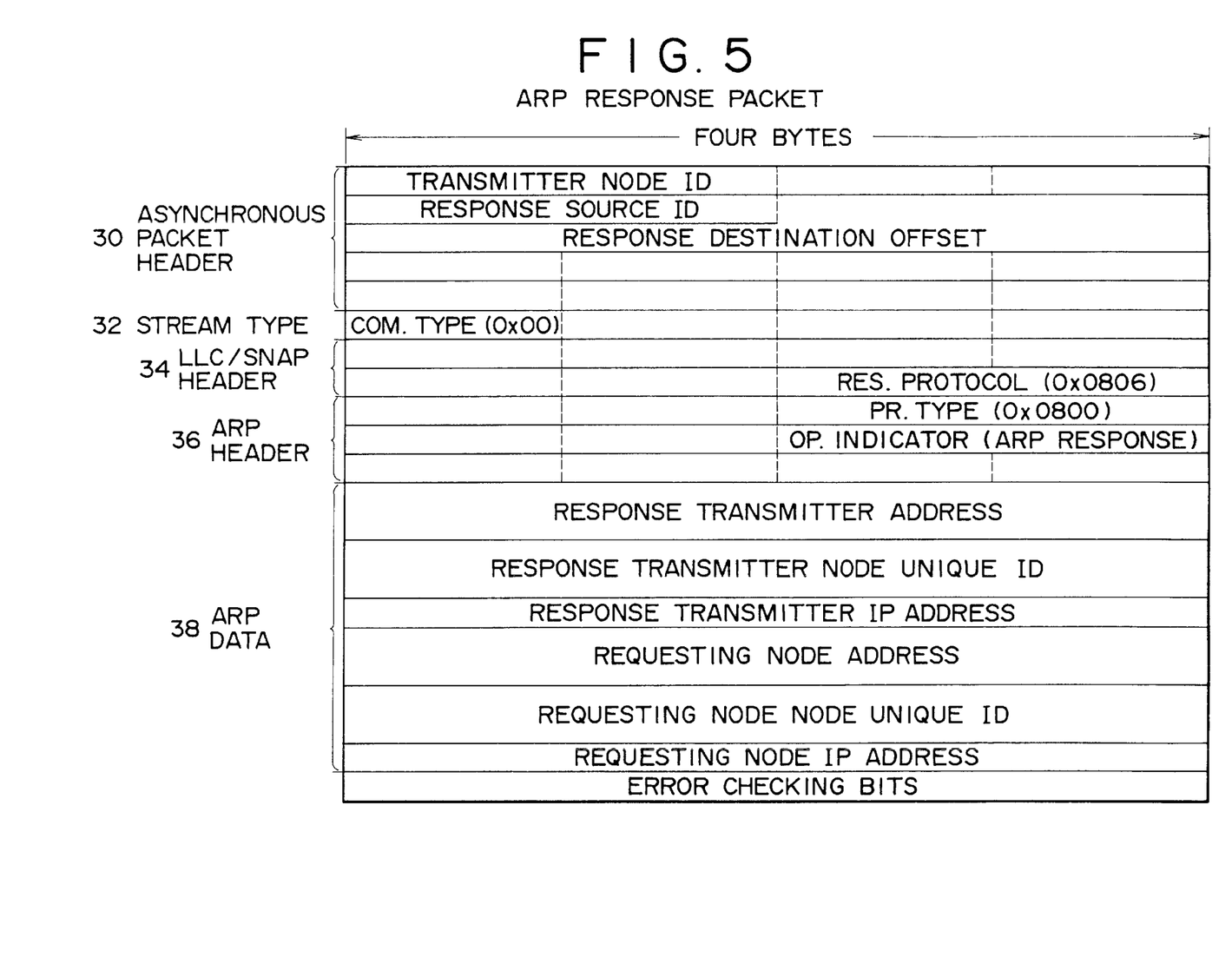
FIG. 5 is a representation of an ARP type response packet in accordance with the invention.

FIGS. 4 and 5 show exemplary ARP type communication packets in accordance with the invention. FIG. 4 shows an ARP type request packet, and FIG. 5 shows an ARP type response packet. As shown in the figures, the ARP request and response packets are asynchronous packets. Each packet includes five primary divisions: an asynchronous packet header 30, a stream type 32, a Logical Link Control/SNAP (LLC/SNAP) header 34, an ARP/RARP header 36, and ARP/RARP data 38. Each of the primary divisions are, in turn, divided into one or more horizontal subdivisions having a length of four bytes each.

Referring to the ARP request packet of FIG. 4, it can be seen that the first item included in the asynchronous packet header is a broadcast bus indicator (e.g. 10 bits representing the string 0x3FE) for indicating which bus or buses in the network should receive the request packet (e.g. all—buses 0 and 1). The next item is a broadcast node indicator (e.g. 6 bits representing the string 0x3F) for indicating which node or nodes in the network should receive the request (e.g. all—nodes 10–22). After the broadcast node indicator is a source ID which is the node ID of the node that transmits the request. Following the source ID is a destination offset (e.g. 6 bytes representing the string 0xFFFF FFFF FFFF) for indicating a location within the memory of intended recipient node where the request should be directed.

The stream type (ST) division includes a communication type indicator (e.g. bits representing the string 0x00) for indicating the type of communication to which the request packet is related (e.g. Logical Link Control—ARP/RARP/IP).

The LLC/SNAP header division includes a resolution protocol indicator (e.g. bits representing the string 0x0806) for indicating the type of protocol to which the request packet is related (i.e. ARP).

The ARP header division includes a protocol type indicator and an operation indicator. The protocol type indicator contains information (e.g. bits representing the string 0x0800) for indicating the protocol to which the request packet is related (e.g. IP protocol). The operation indicator contains information indicating the type of operation to which the packet is related (i.e. ARP request).

Finally, the ARP data division of the ARP request packet will be described. The first item included in the ARP data division is a transmitter address, indicating the address of the node that transmitted the ARP request packet. The transmitter address may be, for example, a 64 bit address, with the first 16 bits indicating the node ID of the transmitting node and the following 48 bits indicating a requesting node offset address, the requesting node offset address being an address within the transmitting node's memory where communication packets are processed (e.g. the address of an application program). The second item in the ARP data division is the node unique ID of the transmitting node (e.g. 64 bits). The third item is the IP address of the transmitting node (e.g. 32 bits), and the fourth item is the IP address (e.g. 32 bits) of the node that is the intended recipient of the request packet.

As an option, the ARP data division may include areas for a destination address and a node unique ID of the destination node. These areas are analogous to those provided for the transmitter address and the node unique ID of the transmitting node, respectively. However, since the request packet is broadcast, the destination areas are indefinite, and therefore are not filled with actual addresses. In an exemplary embodiment, the destination address and destination unique ID areas are 64 bit areas that are filled with zeros to indicate their indefinite state.

As an additional option, error checking bit(s) may be included within the request packet. These bits may be for detecting and/or correcting errors within the packet through implementation of an error checking code, such as a cyclic redundancy code (CRC). Moreover, multiple groups of error checking bits may be included within the packet, with each group dedicated to detecting and/or correcting errors within a distinct portion of the packet. Thus, for example, the ARP header division may include a first group of dedicated error checking bits for use in detecting and/or correcting errors in the header division's contents, while the ARP data division may include a second group of dedicated error checking bits for use in detecting and/or correcting errors in the data division's contents.

The ARP response packet will now be described with reference to FIG. 5. It can be seen from FIG. 5 that the first item included in the asynchronous packet header is a transmitter node ID (e.g. 16 bits) which is the node ID of the node that transmitted the ARP request packet prompting the response. The next item is a response source ID (e.g. 16 bits)

which is the node ID of the node,transmitting the response packet. Following the response source ID is a response destination offset (e.g. 6 bytes) which indicates the location within the memory of the responding node where the protocol specified by the "Protocol type" indicator is processed.

The stream type (ST), LLC/SNAP header, and ARP header divisions of the response packet are similar to the ST, LLC/SNAP header, and ARP header divisions of the request packet. The ST division of the response packet includes a communication type indicator (e.g. bits representing the string 0×00) for indicating the type of communication to which the request packet is related (e.g. Logical Link Control—ARP/RARP/IP). The LLC/SNAP header division includes a resolution protocol indicator (e.g. bits representing the string 0×0806) for indicating the type of protocol to which the request packet is related (i.e. ARP). The ARP header division of the response packet includes a protocol type indicator and an operation indicator—the protocol type indicator containing information (e.g. bits representing the string 0×0800) for indicating the protocol to which the response packet is related (e.g. IP protocol), and the operation indicator containing information indicating the type of operation to which the packet is related (i.e. ARP response).

Finally, the ARP data division of the ARP response packet will be described. The first item included in the ARP data division is a response transmitter address, indicating the address of the node that transmitted the ARP response packet. The response transmitter address may be, for example, a 64 bit address, with the first 16 bits indicating the node ID of the responding node and the following 48 bits indicating a responding node offset address, the responding node offset address being an address within the responding node's memory where communication packets are processed (e.g. the address of an application program). The second item in the ARP data division is the node unique ID of the response transmitting node (e.g. 64 bits). The third item is the IP address of the response transmitting node (e.g. 32 bits), and the fourth item is the IP address (e.g. 32 bits) of the node that is the intended recipient of the response packet.

The ARP data division of the response packet further includes the address of the intended recipient of the response packet (i.e. the requesting node) and the node unique ID of the intended recipient. The format for these additional items may be analogous to the format for the request transmitter address and the request transmitter node unique ID, respectively. Thus, the responding node may simply use the first two items of the request packet's ARP data as the additional items in the response packet, thereby facilitating formation of the response packet.

As was in the case the request packet, the response packet optionally includes error checking bit(s). These bits may be for detecting and/or correcting errors within the packet through implementation of an error checking code, such as a cyclic redundancy code (CRC). Moreover, multiple groups of error checking bits may included within the packet, with each group dedicated to detecting and/or correcting errors within a distinct portion of the packet. Thus, for example, the ARP header division may include a first group of dedicated error checking bits for use in detecting and/or correcting errors in the header division's contents, while the ARP data division may include a second group of dedicated error checking bits for use in detecting and/or correcting errors in the data division's contents.

Having described a network suitable for implementing the invention and ARP type packets in accordance with the invention, an illustrative ARP type communication will now be described.

In an illustrative ARP type communication according to the invention, node 0 on bus 0 (or "node 10" as indicated in FIG. 3) wants to know the physical address of the node having an IP address of 4 (or "node 18" as indicated by FIGS. 2 and 3). Accordingly, node 10 broadcasts an ARP request packet having the format shown in FIG. 4 to all of the nodes in the network—the packet being transmitted to the nodes in bus 1 via the bridge (see FIG. 2). As mentioned above, the request packet includes a destination offset in the ARP header division, and a destination IP address in the ARP data division. In the present illustration the ARP data includes a destination IP address of "4".

Upon reception of the broadcast request packet, each node in the network sends the ARP data of the packet to the address indicated by the destination offset. Each node then reviews the destination IP address indicated in the ARP data of the request, and if the destination IP address does not match the reviewing node's IP address the reviewing node ignores the request. If the destination IP address does match the reviewing node's IP address, the reviewing node generates an ARP response packet like the one shown in FIG. 5. Thus, when node 18 checks the destination IP address of the request packet, it determines that it is the intended recipient and proceeds to generate an ARP response packet.

Incidentally, generation of the ARP response packet is simplified through use of the IP protocol. In particular, by noting from the ARP header of the ARP request packet that the protocol is IP, the node generating the response packet may form the response destination offset (48 bits) by extracting the response source ID (16 bits) from the response transmitter address (64 bits).

ARP type communication in accordance with the invention has advantages over prior ARP systems. One advantage is a reduced computational burden on the responding node's CPU which results from the inclusion of a responding node offset address in the response packet. More, particularly, including the responding node offset address in the response packet allows the requesting node to acquire the responding node offset address, and thereafter transmit information directly to an application program located at the offset address. Thereby, allowing the responding node's CPU to be bypassed.

Another advantage is the invention's ability to accommodate various length ARP packets. As mentioned above, including the responding node offset address in the response packet allows the responding node's CPU to be relieved of having to interpret subsequently received packets. Therefore, packets received at the responding node do not need to be temporarily stored in the responding node's CPU buffer, and the size of the packets that can be used is not limited by the size of CPU buffer (i.e. the packets do not need to fit into the CPU buffer). Accordingly, the invention provides greater packet length flexibility.

Next, RARP type communication in accordance with the invention will be described.

Figure 6:
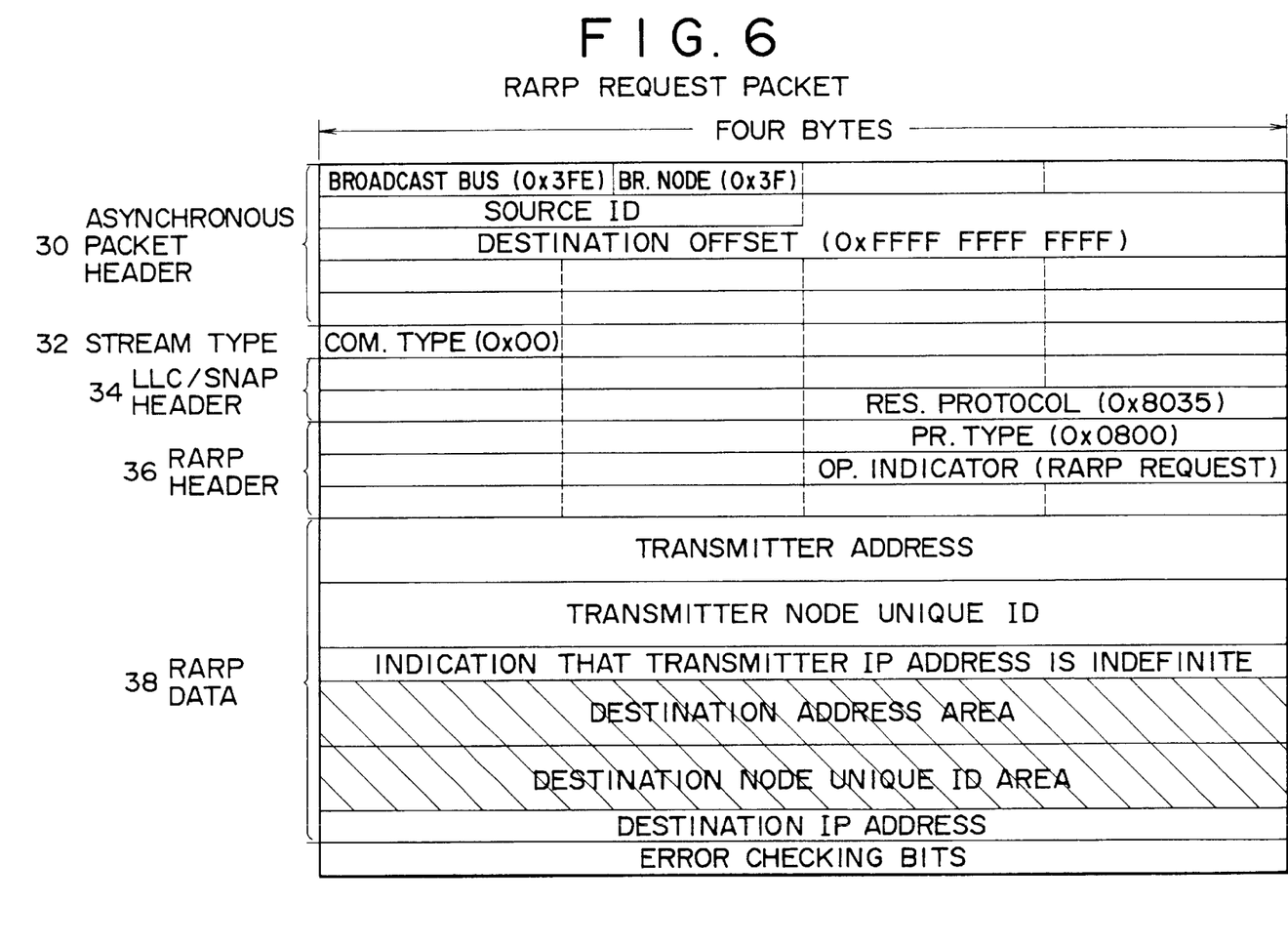
FIG. 6 is a representation of a RARP type request packet in accordance with the invention.
Figure 7:
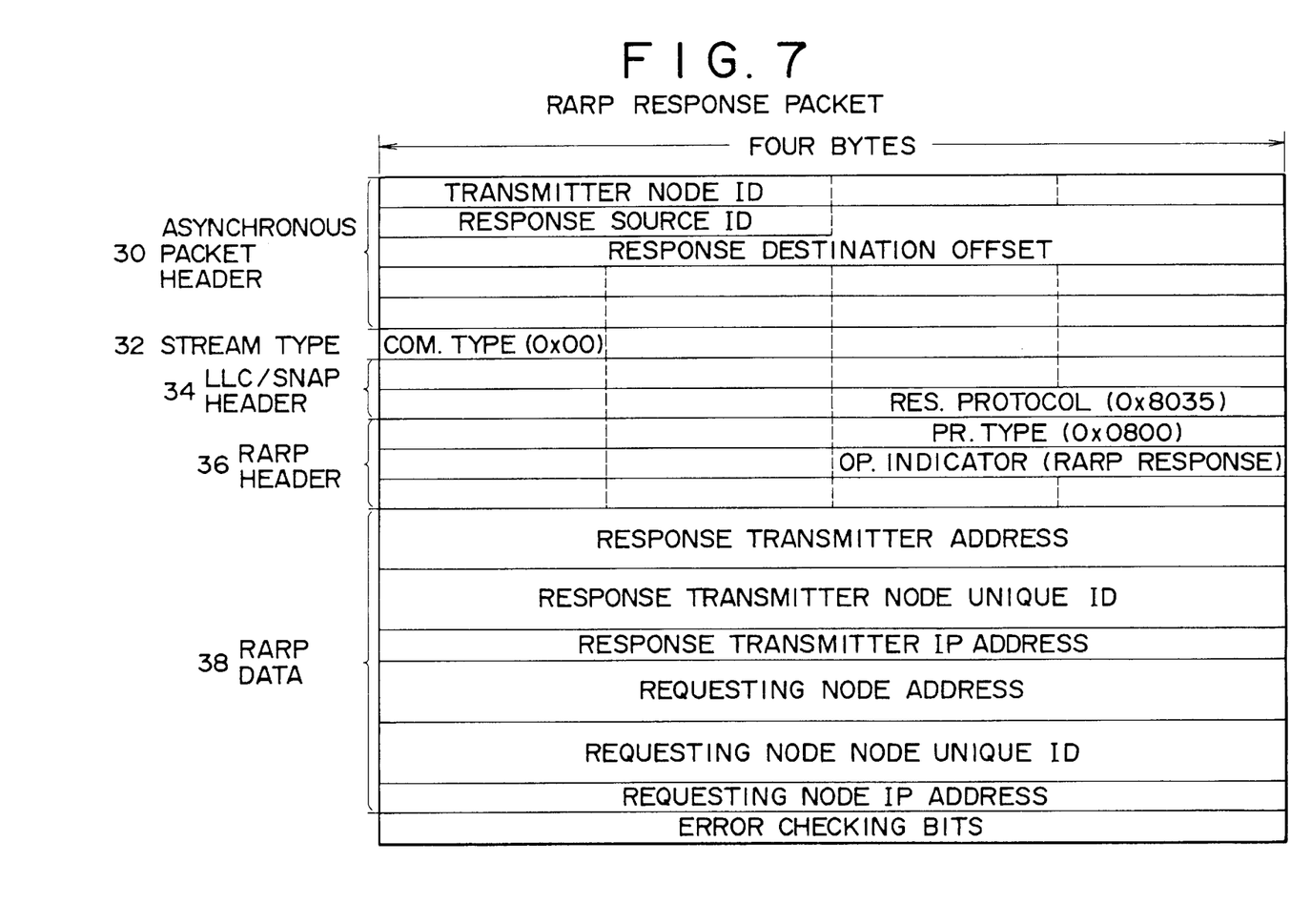
FIG. 7 is a representation of a RARP type response packet in accordance with the invention.

FIGS. 6 and 7 show a RARP type request packet in accordance with the invention and a RARP type response packet in accordance with the invention, respectively. As was the case with ARP type communication, RARP type communication may be implemented in the network of FIG. 2, using the address cache table of FIG. 3. The RARP type packets of FIGS. 6 and 7 are similar to the ARP packets of FIGS. 4 and 5, respectively, and therefore only the differences between the respective ARP and RARP packets will be discussed.

Referring to FIG. 6, it can be seen that the RARP request packet includes the same five primary divisions as the ARP request packet but differs from the ARP request packet in three of the primary divisions. The RARP LLC/SNAP header division includes a resolution protocol indicator (e.g. bits representing the string 0x8035) indicating that the type of protocol to which the request packet is related is RARP rather than ARP. In addition, the RARP header division includes an operation indicator containing information indicating that the type of operation to which the packet is related is RARP request—rather than ARP request. Finally, the RARP data division does not include the IP address of the transmitter node, but rather includes some indicator that the IP address of the transmitter is indefinite (e.g. bits indicating a string of zeros). The absence of the requesting node's IP address is consistent with RARP operation since the very reason RARP requests are generated is so that the requesting node can determine its own IP address.

The RARP response packet differs from the ARP response packet in two of the primary divisions. The RARP LLC/SNAP header division includes a resolution protocol indicator (e.g. bits representing the string 0x8035) indicating that the type of protocol to which the request packet is related is RARP—rather than ARP; and the RARP header division includes an operation indicator containing information indicating that the type of operation to which the packet is related is RARP response—rather than ARP response.

When a RARP type communication is initiated, a node which wants to determine its own IP address generates a RARP request packet as described above. The RARP request is broadcast to all nodes in the network (e.g. the network of FIG. 2) and a node which is assigned to respond to RARP requests (e.g. a server) determines the IP address of the requesting node and generates a RARP response. In determining the IP address of the requesting node, the RARP response node first determines the requesting nodes physical address by referencing the transmitter node's node ID as set forth in the RARP request's asynchronous packet header, alternatively, by referencing the transmitter node's node unique ID as set forth in the RARP request's data division. Once the requesting node's physical address has been determined, the responding node uses its address cache table (e.g. the table of FIG. 3) to cross-references the requesting node's physical address (node ID or unique node ID) with the requesting node's IP address, and inserts the requesting node's IP address into the RARP data portion of the RARP response packet.

Thus, for example, if node 0 of bus 0 (node 10 in FIG. 2) is a server, and node 1 of bus 1 (node 18) wants to determine its IP address, node 18 broadcasts a RARP request that includes its node unique ID ("641"). Node 10 receives the request and uses the address cache table of FIG. 3 to cross-references the received node unique ID with the IP address of node 18 ("4"). Node 10 then inserts the determined IP address into a RARP response packet and transmits the response packet to node 18.

An advantage of performing RARP type signaling in accordance with the invention is that a network implementing such signaling becomes less sensitive to bus resets.

In prior systems, as described above, when a network bus is reset the physical addresses of the nodes in that network may change, giving rise to incorrect RARP cross-references. Thus, for example, if bus 1 of the FIG. 2 network is reset the node ID of node 1 on bus 1 (node 18) may change from "1" to "3". Thereafter, if node 18 transmits a RARP request including its node ID of "3", and the responding node uses the table of FIG. 3 to cross-reference the node ID, the IP address of node 18 will be incorrectly determined to be "7".

However, the present invention allows IP addresses to be cross-referenced through node unique IDs. Since node unique IDs do not change upon the occurrence of bus resets, their use in RARP cross-referencing insures correct determination of a requesting node's IP address. Thus, in the example, the responding node would use the cache table to correctly cross-reference node 18's node unique ID to the IP address of "4".

While the present invention has been particularly shown and described in conjunction with preferred embodiments thereof, it will be readily appreciated by those of ordinary skill in the art that various changes may be made without departing from the spirit and scope of the invention. For example, although the invention has been described in the context of IEEE-1394 communications it may be applied in the context of IPX communications and Apple Talk communications. Therefore, it is intended that the appended claims be interpreted as including the embodiments described herein as well as all equivalents thereto.

What is claimed is:

1. A method for implementing communication over a network, comprising the steps of:
    transmitting an ARP or RARP request packet from a first computer to a second computer; and
    transmitting an ARP or RARP response packet from said second computer to said first computer;
    wherein said response packet includes a physical address and an offset address, said physical address indicating the location within the network where said second computer is located and said offset address indicating a location within said second computer where an application program processes communication packets, said application program performing at least one operation other than a memory fetch operation.

2. The method according to claim 1, wherein said offset address is included within a 64 bit string.

3. The method according to claim 1, wherein said request packet includes a node unique ID identifying said first node.

4. The method according to claim 1, wherein communications packets are processed according to the internet protocol.

5. The method according to claim 1, wherein the network comprises one or more IEEE-1394 buses.

6. The method according to claim 1, wherein communication packets received at said second node are passed to said location indicated by said offset address prior to any processing of said packets.

7. An apparatus for implementing communication over a network, comprising:
    means for transmitting an ARP or RARP request packet from a first computer to a second computer; and
    means for transmitting an ARP or RARP response packet from said second computer to said first computer;
    wherein said response packet includes a physical address and an offset address, said physical address indicating the location within the network where said second computer is located and said offset address indicating a location within said second computer where an application program processes communication packets, said application program performing at least one operation other than a memory fetch operation.

8. The apparatus according to claim 7, wherein said offset address is included within a 64 bit string.

9. The apparatus according to claim 7, wherein said request packet includes a node unique ID identifying said first node.

10. The apparatus according to claim 7, wherein communications packets are processed according to the internet protocol.

11. The apparatus according to claim 7, wherein the network comprises one or more IEEE-1394 buses.

12. The apparatus according to claim 7, wherein communication packets received at said second node are passed to said location indicated by said offset address prior to any processing of said packets.

13. An apparatus for implementing communication over a network, comprising:

a first general purpose computer for formulating an ARP or a RARP request packet and for initiating transmission of said request packet over said network; and a second general purpose computer for receiving said request packet over said network, for formulating an ARP or a RARP response packet, and for initiating transmission of said response packet to said first general purpose computer;

wherein said response packet includes a physical address and an offset address, said physical address indicating the location within the network where said second general purpose computer is located and said offset address indicating a location within said second general purpose computer where an application program processes communication packets, said application program performing at least one operation other than a memory fetch operation.

14. The apparatus according to claim 13, wherein said offset address is included within a 64 bit string.

15. The apparatus according to claim 13, wherein said request packet includes a node unique ID identifying said first network node computer.

16. The apparatus according to claim 13, wherein communications packets are processed according to the internet protocol.

17. The apparatus according to claim 13, wherein the network comprises one or more IEEE-1394 buses.

18. The apparatus according to claim 13, wherein communication packets received at said second network node computer are passed to said location indicated by said offset address prior to any processing of said packets.

* * * * *